(12) United States Patent
Teglia (10) Patent No.: US 11,200,322 B2
(45) Date of Patent: Dec. 14, 2021

(54) PROTECTION OF DATA STORED IN AN INTEGRATED CIRCUIT

(71) Applicant: STMicroelectronics (Rousset) SAS, Rousset (FR)

(72) Inventor: Yannick Teglia, Belcodene (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 718 days.

(21) Appl. No.: 14/668,676

(22) Filed: Mar. 25, 2015

(65) Prior Publication Data

US 2015/0356296 A1    Dec. 10, 2015

(30) Foreign Application Priority Data

Jun. 10, 2014 (FR) .................................... 1455257
Jun. 10, 2014 (FR) .................................... 1455258

(51) Int. Cl.

| | |
|---|---|
| G06F 21/55 | (2013.01) |
| G01K 13/00 | (2021.01) |
| G06F 21/57 | (2013.01) |
| G06F 21/71 | (2013.01) |
| G06F 12/14 | (2006.01) |

(52) U.S. Cl.
CPC .......... G06F 21/575 (2013.01); G01K 13/00 (2013.01); G06F 12/1458 (2013.01); G06F 21/554 (2013.01); G06F 21/71 (2013.01); G06F 2212/1052 (2013.01); G06F 2221/034 (2013.01); G06F 2221/2137 (2013.01)

(58) Field of Classification Search
CPC .... G06F 21/554; G06F 12/1458; G06F 21/71; G06F 21/575; G06F 2221/034; G06F 2221/2137; G06F 2212/1052; G01K 13/00

See application file for complete search history.

(56) References Cited

U.S. PATENT DOCUMENTS

| | | |
|---|---|---|
| 6,330,668 B1 | 12/2001 | Curiger et al. |
| 8,719,666 B2 | 5/2014 | Marinet |
| 2009/0096495 A1* | 4/2009 | Keigo ...................... G01K 7/01 327/142 |
| 2012/0006122 A1* | 1/2012 | Aitken .................... H01L 22/12 73/763 |
| 2012/0079593 A1* | 3/2012 | Adams .................. G06F 21/554 726/23 |
| 2014/0191813 A1* | 7/2014 | Sul ........................ H03K 3/0315 331/46 |

(Continued)

FOREIGN PATENT DOCUMENTS

| | | |
|---|---|---|
| FR | 2 974 648 A1 | 11/2012 |
| WO | 2011/018414 A2 | 2/2011 |

OTHER PUBLICATIONS

Franco et al., "Ring Oscillators as Thermal Sensors in FPGAS: Experiments in Low Voltage," IEEE, 2010, pp. 133-137. (6 pages).

(Continued)

*Primary Examiner* — Douglas X Rodriguez
*Assistant Examiner* — Haidong Zhang
(74) *Attorney, Agent, or Firm* — Seed IP Law Group LLP (57) ABSTRACT

A method of detecting a cold-boot attack on an integrated circuit, including the steps of: periodically sampling a signal delivered by at least one ring oscillator; and verifying that the proportion of states "1" and of states "0" of the result of the sampling is within a range of values.

18 Claims, 4 Drawing Sheets

(56) References Cited

U.S. PATENT DOCUMENTS

| | | | |
|---|---|---|---|
| 2014/0215613 A1* | 7/2014 | Kelley | G06F 21/86 |
| | | | 726/23 |
| 2014/0266473 A1* | 9/2014 | Lewis | H03K 3/0315 |
| | | | 331/46 |
| 2016/0239663 A1 | 8/2016 | Healy et al. | |

OTHER PUBLICATIONS

Müller, "Keepers of the Codes," *Pictures of the Future*, Fall 2005, p. 39.
Gruhn et al., "On the Practicability of Cold Boot Attacks," *International Conference on Availability, Reliability and Security*, Regensburg, Germany, Sep. 2-6, 2013, pp. 390-397.
Halderman et al., "Lest We Remember: Cold Boot Attacks on Encryption Keys," *Proceedings of the $17^{th}$ USENIX Security Symposium*, San Jose, California, USA, Jul. 28-Aug. 1, 2008, 16 pages.
Simmons, "Security Through Amnesia: A Software-Based Solution to the Cold Boot Attack on Disk Encryption," *Annual Computer Security Applications Conference*, Orlando, Florida, USA, Dec. 5-9, 2011, pp. 73-82.

\* cited by examiner

PROTECTION OF DATA STORED IN AN INTEGRATED CIRCUIT

BACKGROUND

Technical Field

The present disclosure generally relates to electronic circuits and, more specifically, to circuits containing elements storing data in non-volatile fashion, such as, for example, integrated electronic systems (System On Chip).

Discussion of the Related Art

As soon as an electronic system manipulates digital data, the data are typically at least temporarily stored in elements of the electronic circuits. These typically are RAM-type volatile storage elements, or registers or flip-flops storing binary data when they are being processed by the electronic circuit.

In principle, these data disappear when the integrated circuit is no longer powered. Actually, they do not really disappear, but the state that they represent is no longer reliable on restarting of the circuit.

In circuits manipulating digital data considered as secret, that is, that can only be accessed by authorized users or circuits, it should be ascertained that the data volatilely manipulated by an integrated circuit are no longer accessible in storage elements for applications other than authorized applications. Areas of the RAM assigned to such applications are thus generally reserved. Such a reservation is however dynamic, that is, it disappears at the circuit switching down or resetting. It should thus be ascertained that the data contained in previously-reserved areas are no longer accessible, for example, after a restarting of the electronic system. Indeed, even if the circuit switching down makes the data non-reliable, they are capable of containing, even partially, secret information. A first step of resetting the volatile memory elements is thus provided at the switching up of an electronic circuit, by erasing the memory at the switching up. Such a technique takes time.

BRIEF SUMMARY

In an embodiment, a method of detecting an attack by cooling of an integrated circuit, comprises: periodically sampling a signal provided by at least one ring oscillator; verifying that the proportion of states "1" and of states "0" of the result of the sampling is within a range of values.

According to an embodiment, said range of values is determined by statistical analysis in a training phase during which the circuit is placed in a normal temperature range.

According to an embodiment, the method is applied to the protection of information contained in a volatile memory of the integrated circuit against attacks by successive operations of switching up and down and cooling of the circuit.

In an embodiment, an integrated circuit comprises: at least one ring oscillator; and a circuit of periodic interpretation of an output of the ring oscillator.

According to an embodiment, the circuit further comprises a flip-flop for sampling the output of the ring oscillator.

According to an embodiment, the circuit further comprises a non-volatile memory having said range of values stored therein.

According to an embodiment, the circuit further comprises a volatile memory comprising information to be protected against attacks by successive operations of switching up and down and cooling of the circuit.

In an embodiment, a method comprises: sampling a series of bits output by a logic circuit of an integrated circuit; generating an indication of a proportion of the series of bits in a first state; and generating an indication of a cold-boot attack based on the generated indication of the proportion of the series of bits in the first state. In an embodiment, the logic circuit comprises at least one ring oscillator. In an embodiment, the generating the indication of the proportion comprises counting a number of bits in the first state and the generating the indication of the cold-boot attack comprises determining whether the number of bits in the first state is within a range of values. In an embodiment, said range of values is determined by statistical analysis in a training phase during which the integrated circuit is operated in a normal temperature range. In an embodiment, the generating the indication of the proportion comprises counting a number of bits in the first state and the generating the indication of the cold-boot attack comprises comparing the number of bits in the first state to one or more threshold values. In an embodiment, the first state is a one state. In an embodiment, the method comprises periodically repeating the sampling, the generating of the indication of the proportion and the generating of the indication of a cold-boot attack.

In an embodiment, a device comprises: a logic circuit; and sampling circuitry configured to: sample an output generated by the logic circuit; generate an indication of a proportion of bits in the sampled output in a first state; and generate an indication of a cold-boot attack based on the generated indication of the proportion of the bits in the first state. In an embodiment, the device is an integrated circuit and the logic circuit comprises at least one ring oscillator. In an embodiment, the sampling circuitry is configured to count a number of bits in the sampled output in the first state and to generate the indication of the cold-boot attack based on whether the counted number of bits is within a range of values. In an embodiment, said range of values is determined by statistical analysis in a training phase during which the integrated circuit is operated in a normal temperature range. In an embodiment, the sampling circuitry is configured to count a number of bits in the sampled output in the first state and to compare the counted number of bits in the first state to one or more threshold values. In an embodiment, the sampling circuitry is configured to periodically repeat the sampling, the generating of the indication of the proportion and the generating of the indication of a cold-boot attack. In an embodiment, the device comprises a flip-flop configured to sample the output of the ring oscillator. In an embodiment, the device comprises a non-volatile memory having said range of values stored therein. In an embodiment, the device comprises a volatile memory configured to store information.

In an embodiment, a system comprises: a processing unit; a random access memory; and cold-boot attack detection circuitry, including: a logic circuit; and sampling circuitry configured to: sample an output generated by the logic circuit; generate an indication of a proportion of bits in the sampled output in a first state; and generate an indication of a cold-boot attack based on the generated indication of the proportion of the bits in the first state. In an embodiment, the system comprises an integrated circuit including the cold-boot attack detection circuitry. In an embodiment, the logic circuit includes at least one ring oscillator. In an embodiment, the sampling circuitry is configured to periodically repeat the sampling, the generating of the indication of the proportion and the generating of the indication of a cold-boot attack.

DETAILED DESCRIPTION

The same elements have been designated with the same reference numerals in the different drawings. For clarity, only those steps and elements which are useful to the understanding of the embodiments which will be described have been shown and will be detailed. In particular, the structure of a volatile memory has not been detailed, the described embodiments being compatible with usual structures and characteristics of such memories and volatile storage elements. Further, the circuits and electronic systems comprising volatile storage elements having a content which needs protection have not been detailed either, the described embodiments being here again compatible with usual circuits and systems.

Figure 1:
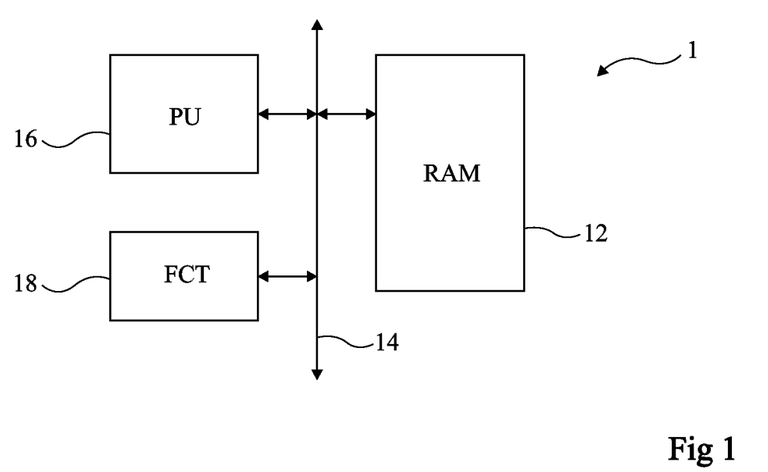
FIG. 1 is a block diagram of an example of an electronic circuit of the type to which the embodiments which will be described may apply.

FIG. 1 schematically shows in the form of blocks an example of an integrated electronic circuit comprising a volatile memory 12 having a content which is desired to be totally or partially protected. This memory is connected by one or a plurality of data, address, and control buses 14 to different electronic circuits of system 1. For example, at least one processing unit 16 (PU) is capable of using memory 12 to temporarily store manipulated data therein. Other circuits of the electronic system may also need access to memory 12. In FIG. 1, these other circuits or functions have been illustrated by a block 18 (FCT).

Memory 12 stores different data manipulated by the different circuits, and particularly by processing unit 16. In applications where the electronic circuit manipulates secret quantities, be they data or algorithms, one or a plurality of areas of memory 12 are dedicated to such so-called secure applications. To achieve this, on starting of the circuit or when it is initialized, processing unit 16 or a unit dedicated to the memory (memory management unit, for example) configures rights of access to these areas of memory 12 and, for example, reserves the access of certain areas to programs authorized to manipulate the secret data.

A problem which arises is the vulnerability of the data stored in the volatile memory to attacks by resetting of the circuit. Indeed, when the circuit is switched down and back up, an interruption of the protected area configuration process or of the RAM reset process may provide access to the secret data processed before the resetting.

An example of this type of attack is known as "Cold Boot" since they often come along with a cooling of the integrated circuit to slow down the reset process.

Such attacks are generally performed repeatedly, that is, the attacker successively turns the integrated circuit off and on with a short delay (so that the memory does not have time to reset).

The inventor has discovered that, for a same cell content in a volatile memory, this content would statistically mainly take the same values after a switching down and back up. In other words, based on a pattern stored in a memory area, a pattern related thereto, or a proportion of states 0 and of states 1, can be found in the memory content after each resetting. It is then possible to determine the pattern or the proportion of states 0 and of states 1 that the memory will take after the storage of the first pattern and the successive reset operations. Pattern means a set of binary states contained in the concerned memory area.

According to an embodiment, it is provided to dedicate to the detection of cold boot type attacks a volatile memory separated from the memory storing the critical data, for example, of a size smaller than the size of the volatile memory used by the circuit.

According to an embodiment, it is provided to use a ring oscillator to detect an attack of cold boot type. The inventor has indeed observed that the reproducibility of the successive output states of a flip-flop sampling an output of such an oscillator is similar to that of a pattern in a volatile memory. A difference however is that the pattern is native in the case of a ring oscillator.

In both cases, it is started by determining, in a preparatory or training phase, the value or the proportion of states taken by the dedicated memory or the oscillator output after sudden resets. Such a determination then enables, in an operational phase, to compare the value or the proportion of states, for example, periodically, to detect a possible attack.

Figure 2:
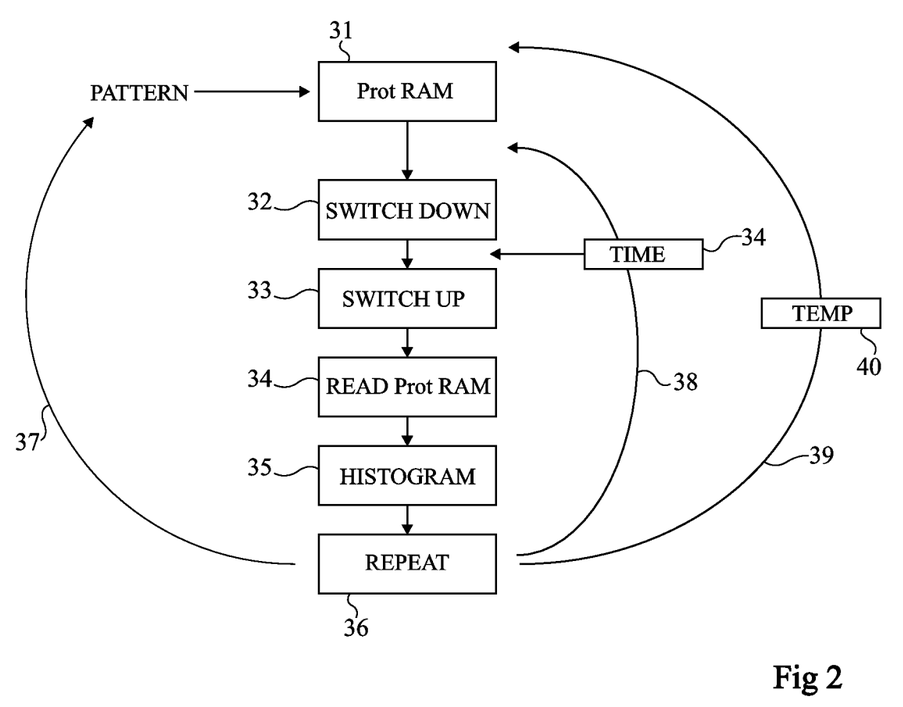
FIG. 2 is a simplified representation of an embodiment of a first phase of a method of protecting the content of a RAM.

FIG. 2 is a block diagram illustrating an embodiment of a preparatory phase of a method of detecting a reset attack of the above-described type, applied to the first aspect.

In an embodiment, a pattern is determined which will then be stored in a non-volatile memory of the circuit to be transferred, at each initialization, into the volatile memory dedicated to the protection.

Thus, according to an embodiment, in a preparatory or training phase, a pattern is stored in a volatile memory (block 31, PROT RAM) dedicated to the protection or reference memory. This memory 31 may be different from the memory to be protected (12, FIG. 1). In an embodiment, the power supply of the memory 31 can be cut off/activated at will (for each verification). Indeed, it should be able to be switched down and back up independently from the volatile memory to be protected, which would otherwise lose its content each time a verification is performed. The preparatory phase may be carried out, for example, at the end of the memory manufacturing, during a process of initialization of the implemented protection method, for example, to order, during the integrated circuit operation.

The circuit 31 is then switched down (block 32, SWITCH DOWN), and then, after a short delay, switched back up (block 33, SWITCH UP). The delay between the switching down and up (power-off time) may be configurable (block 34, TIME) and may take different values. Typically, this delay is in the range from a few microseconds to a few seconds.

Once the circuit has been switched back up, the memory content is read (block 34, READ ProtRAM). This reading is of course performed without having reset the memory. The reading aims at determining the number of memory cells which have switched state under the effect of the switching down/up. Rather than looking for the pattern stored in the memory, it is aimed at determining the effect of the switching down/up on the memory. The number of state switchings is stored (block 35, HISTOGRAM) and the process is repeated several times (block 36, REPEAT). This repeating aims at statistically determining the histogram of the number of state switchings on switching up of the memory.

The steps may be repeated for a plurality of patterns (arrow 37), for a plurality of time periods (arrow 38) and a plurality of temperatures (arrow 39 and block 40—TEMP). As a variation, they are also repeated for a plurality of power supply voltages.

To execute the process according to a plurality of patterns, it is returned to step 31 of storage into memory ProtRAM. To execute the process according to a plurality of power-off time periods, it is returned to switch-down step 32. To execute the process with a plurality of temperatures, it is returned before step 31 to try again with different patterns.

An aim of this training phase is, for a given pattern, to determine in which statistical interval the number of state switchings after a switching down/up is located, mainly for different temperatures and preferably different power-off time periods and different power supply voltages. According to an embodiment, the Hamming distance between the reference pattern and the current pattern is determined by combining their respective states by an XNOR-type comparison.

One or a plurality of patterns and one or a plurality of power-off times periods which are most representative in terms of information relative to the circuit temperature are extracted from the training phase. In other words a pattern and a power-off time period for which the variation of the number of state switchings according to the circuit temperature is most significant are searched for. Thus, in operational phase, a switching down and up of the reference memory containing this pattern enables to assess the circuit temperature and, accordingly, the probability of being confronted to an attack.

Figure 3:
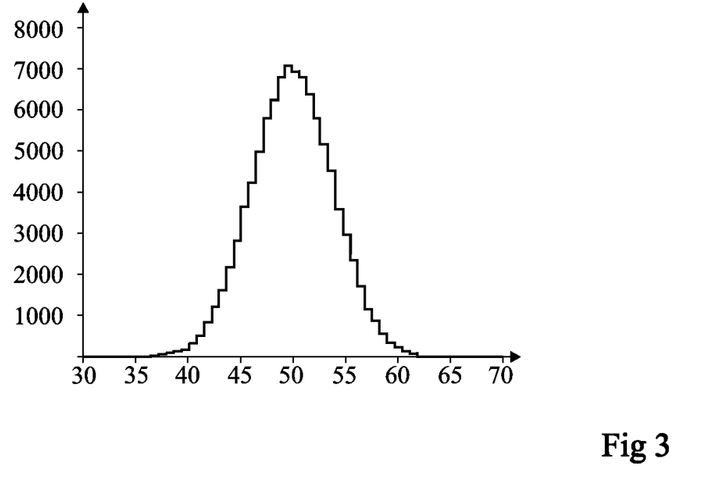
FIG. 3 illustrates an example of a histogram obtained by implementing the method of FIG. 2.

FIG. 3 is a histogram illustrating the implementation of the training phase described in relation with FIG. 2. This drawing illustrates an example of number of cells having switched states for a given pattern and temperature. This example discloses a Gaussian curve centered on 48%, staged between 40 and 60%. The histogram enables, for example, to set an interval of the number of state switchings which, if it is not respected during a verification in operational phase, means that there is a high risk of being confronted to an attack.

Once the pattern has been selected, it is stored in a non-volatile memory area of circuit 1. The protection RAM is configured so that it can be loaded with the pattern on each reset operation.

Figure 4:
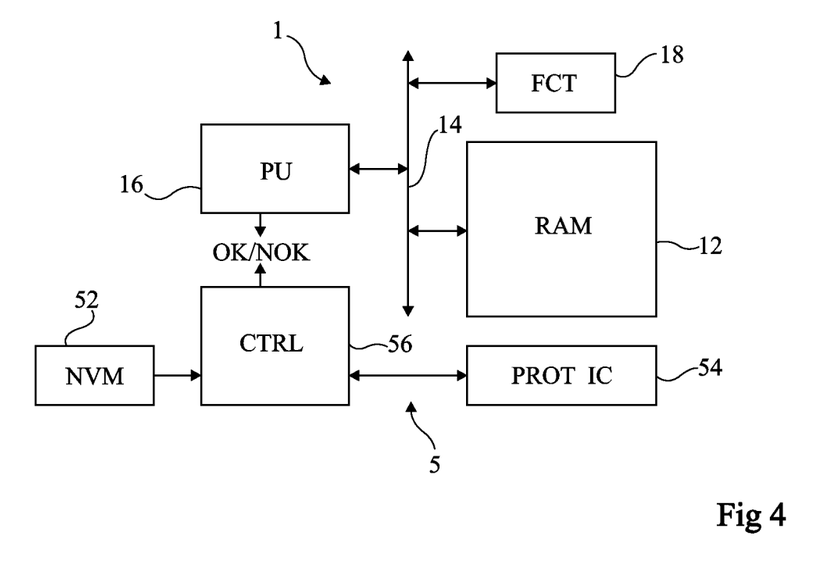
FIG. 4 is a block diagram of an embodiment of an integrated circuit provided with a circuit for detecting an attack by cooling and switching up.

FIG. 4 shows in the form of blocks an embodiment of an integrated circuit 1 provided with cold-boot attack detection circuits 5.

It comprises a processing unit 16, a volatile memory 12 to be protected, and one or a plurality of functions 18. Further, circuit 5 comprises a non-volatile memory 52 (NVM). This memory is not necessarily dedicated to the protection, and may be a memory used by the other circuit functions. It may, unlike what is shown, be connected to buses 14.

Detection circuit 5 comprises a protection circuit 54 (PROT IC), for example, according to an embodiment, a volatile memory (31, FIG. 2) dedicated to the protection or, according to an embodiment which will be described in relation with FIGS. 7 and the following, a ring oscillator and a control circuit 56 (CTRL). Circuit 56 provides a detection result OK/NOK, for example, to processing unit 16, to take countermeasures (for example, a blocking of circuit 1) in the case where an attack is detected.

In an embodiment, control circuit 56 controls the transfer of the pattern stored in memory 52 to memory 54 each time the circuit is reset.

In the representation of FIG. 4, memories 52 and 54 have been illustrated as communicating with circuit 56 only. As a variation, they may be connected to buses 14 and, for memory 52, also be used for other functions.

Figure 5:
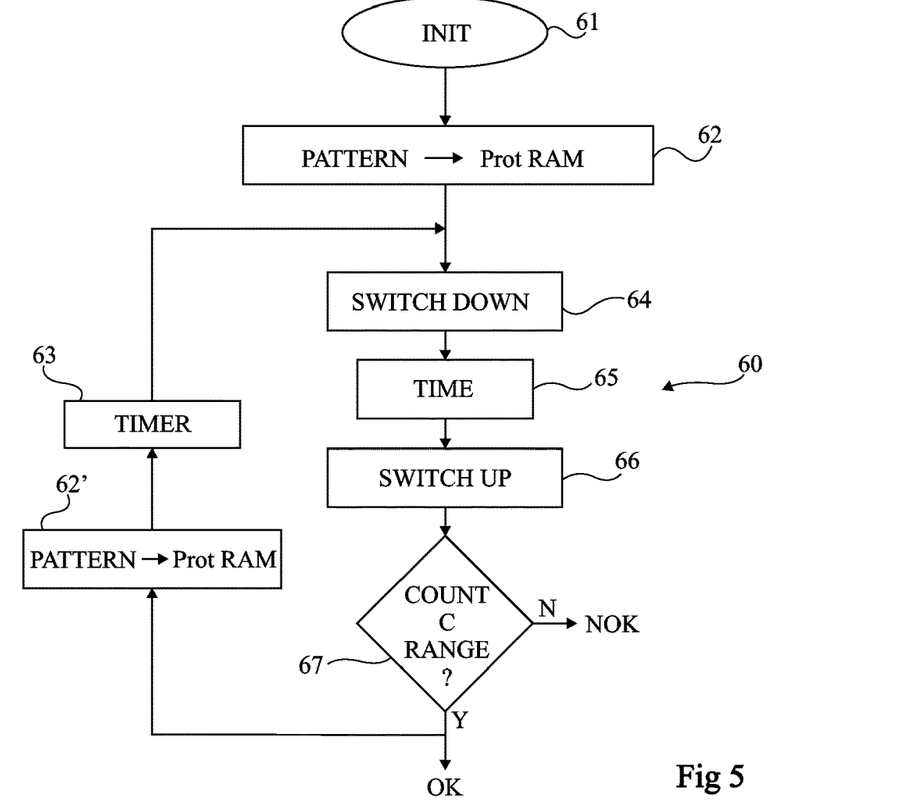
FIG. 5 is a simplified representation of an embodiment of a second phase of the protection method of FIG. 2.

FIG. 5 schematically shows in the form of blocks an embodiment of a cold-boot attack detection method.

For each initialization (block 61, INIT) or resetting of circuit 5, the pattern stored in memory 52 is transferred (block 62, PATTERN→Prot RAM) into protection memory 54.

Then, circuit 36 starts, periodically in an embodiment, (loop illustrated by block 63, TIMER), a verification procedure 60.

This procedure starts with a switching down (block 64, SWITCH DOWN), followed after a power-off time (block 65, TIME), by a switching up (block 66, SWITCH UP) of reference memory 54 (here, memory 31, FIG. 2). Circuit 56 (or unit 16, for example, according to whether it is formed in hardware or software fashion) then causes a reading from the reference memory to count the number of cells having switched state and verifies whether this number is within the interval associated with the pattern (block 67, COUNT C RANGE?). Interval RANGE of authorized values is for example stored with the pattern in the non-volatile memory and is then read on each verification. If number COUNT is correct (output Y of block 67), the risk of being confronted to an attack is negligible and circuit 56 returns a state OK. The pattern is then reloaded into the reference memory from the non-volatile memory (block 62', PATTERN→Prot RAM) to be ready for the next verification.

If number COUNT is outside of the range (output N of block 67), this means a high probability of being confronted to an attack, that is, the circuit has been cooled since the last verification, and circuit 56 returns a state NOK.

According to an embodiment, the characterization phase has enabled to determine a pattern which does not require being loaded, that is, in the authorized temperature range, the switching down/up of the reference memory provides a count COUNT remaining within the authorized range with no pattern reloading. In this case, step 62' is avoided.

The periodicity with which the test is performed is selected to be sufficiently short for the number of possible attacks by interruption between two tests to be insufficient for an attacker to discover the critical information.

According to the fineness desired in the detection, a plurality of patterns may be kept for different temperatures in the non-volatile memory and their respective responses. The pattern to be stored can then be selected according to the operating temperature of the circuit (which may be fitted with a temperature sensor) and the pattern can be updated, in the protection RAM, according to the operating temperature. Of course, this is done at the cost of a larger space in the non-volatile memory. As a specific example embodiment, the pattern comprises from 8 to 64 bits.

Figure 6:
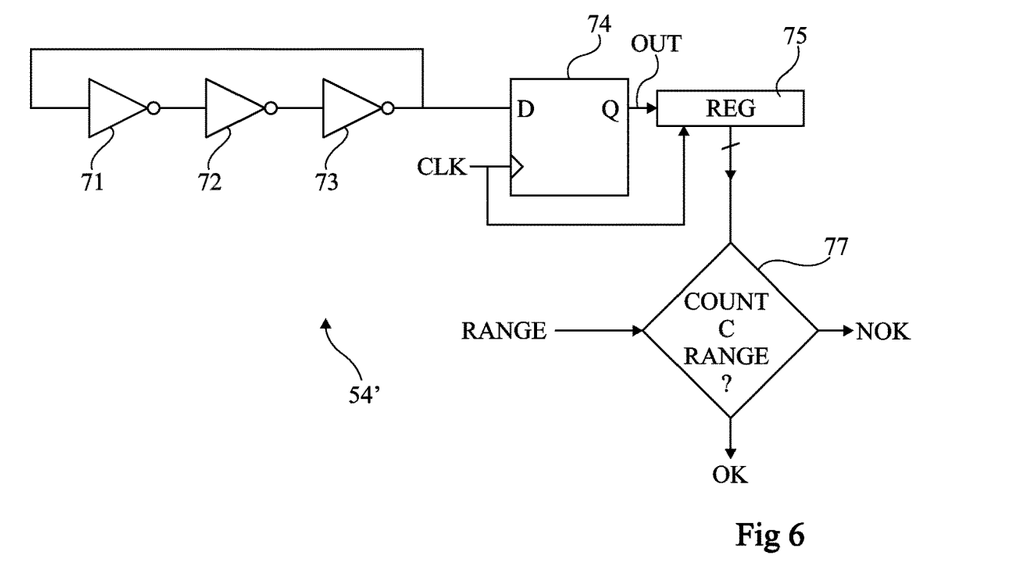
FIG. 6 schematically shows in the form of blocks an embodiment of an element of a detection circuit.

FIG. 6 shows the electric diagram of an embodiment.

It is provided to integrate one or a plurality of ring oscillators in circuit 5. In the example of FIG. 6, the oscillator comprises three series-connected inverters 71, 72, and 73, the output of last inverter 73 being looped back on the input of the first one, 71, and being connected to a data input D of a D flip-flop 74. The clock input of flip-flop 74 receives a clock signal CLK and its output, for example, its direct output Q, provides a detection signal OUT. Actually, the sampling performed by the D flip-flop provides a succession of states at the rate of clock CLK. As a variation, the clock input of the flip-flop is driven by a ring oscillator different from oscillator 54'.

Signal OUT is interpreted to determine its variation relative to a reference signal in an authorized operating temperature range.

For example, signal OUT is sent to the input of a shift register 75 (REG) at the rate of clock CLK, storing a result originating from the previous outputs of the ring oscillator. Each time a verification is needed (on each attack detection test), it is verified (block 77, COUNT C RANGE?) whether the number of states "1" (or the number of states "0") in register 75 is within an authorized range RANGE.

Indeed, the response of the ring oscillator varies according to temperature, which influences the thermal noise of the transistors, which conditions the state switchings at input D of flip-flop 74.

As in the case of a reference volatile memory described hereabove, the statistical response (that is, the state of the output bit of flip-flop 74 or, more specifically, the number of "0s" or of "1s" in register 75) is determined at different temperatures, in a training phase, to determine the majority output taken on switching up. Interval RANGE with which the response of circuit 54' is to be compared is, as in the embodiment based on a dedicated memory, stored in non-volatile memory 32.

As compared with the embodiment of FIG. 2, no pattern is here to be selected. The pattern can be considered as being "native" in a way and stored in hardware fashion by the ring oscillator. To improve the statistical effect, a plurality of ring oscillators in parallel, having their outputs combined (for example, by XOR) may be provided, flip-flop 74 receiving the result of this combination.

Figure 7A:
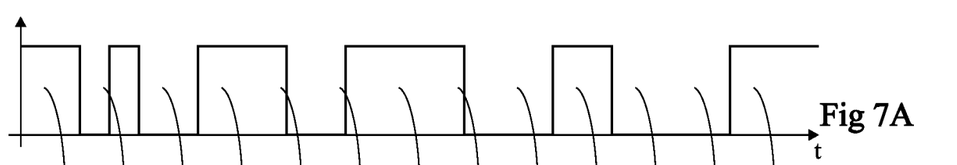
FIGS. 7A to 7C and 8A to 8C illustrate the operation of the detection circuit of FIG. 6.
Figure 7B:
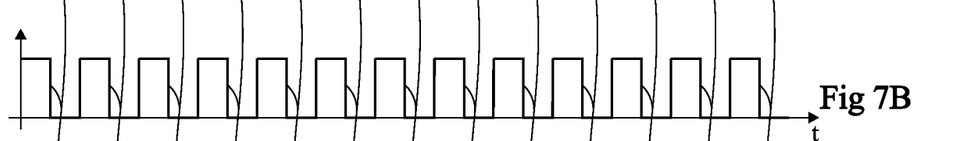
Figure 7C:
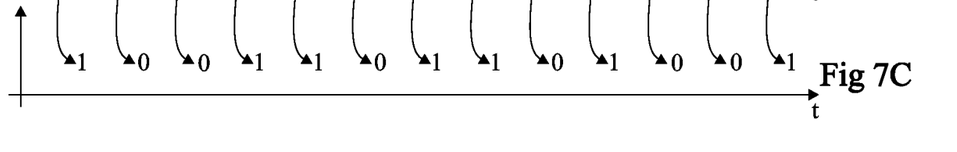
Figure 8A:
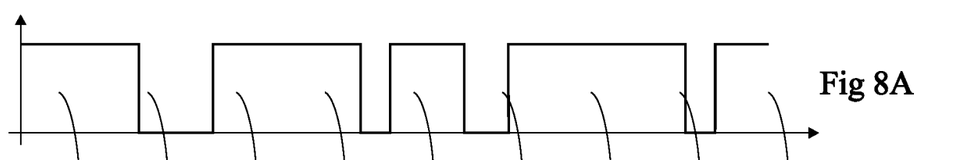
Figure 8B:
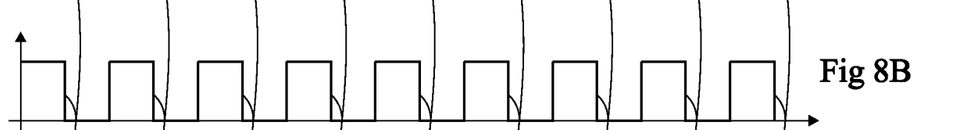
Figure 8C:
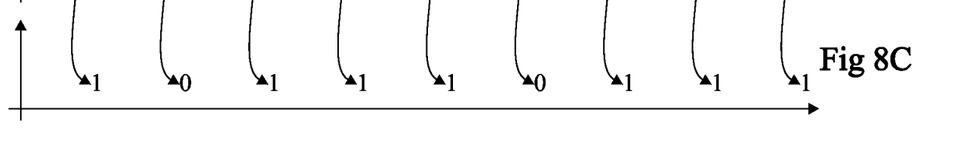

FIGS. 7A, 7B, 7C, 8A, 8B, 8C illustrate the circuit operation according to the second aspect, respectively in "normal" operation (FIGS. 7A to 7C) and in the presence of an attack by cooling of the circuit (FIGS. 8A to 8C). FIGS. 7A and 8A illustrate examples of the shape of the signal at the D input of flip-flop 74. FIGS. 7B and 8B illustrate corresponding examples of clock signal CLK. FIGS. 7C and 8C illustrate corresponding examples of output signal Q of flip-flop 74, and thus of the content of register 75.

In the normal operating range of the circuit, the oscillations have a given shape (arbitrary). In the presence of a cold-boot attack, the shape of the oscillations of the ring oscillator is altered. As to the clock signal, assuming that the clock is stable, the cooling results in modifying the frequency, but not the duty cycle. Thus, the signal at the output of flip-flop 75 has another shape than when there is no attack.

As a variation, a circuit of another nature is integrated to play the role of circuit 54'. In an embodiment, an integrated circuit is employed for which the statistical response of an output signal is different, when it is submitted to repeated switching down/up operations with a cooling, from the response during a stable operation.

Specific embodiments have been described. Various alterations, modifications, and improvements will readily occur to those skilled in the art. In particular, the practical implementation of the described embodiments is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sampling, using a sampling circuit, a series of bits output by a logic circuit of an integrated circuit, the logic circuit including a plurality of ring oscillators having outputs XORed together to generate the series of bits;
generating, using the sampling circuit, an indication of a proportion of the series of bits in a first state;
generating, using the sampling circuit, an indication of detection of a cold-boot attack based on the generated indication of the proportion of the series of bits in the first state; and
restricting access to the integrated circuit in response to the indication of detection of a cold-boot attack indicating a cold-boot attack, wherein;
the generating the indication of the proportion comprises counting a number of bits in the first state and the generating the indication of detection of the cold-boot attack comprises determining whether the number of bits in the first state is within a range of values; and the range of values is determined by statistical analysis in a training phase during which the integrated circuit is repeatedly switched down and up.

2. The method of claim 1 wherein said range of values is determined by statistical analysis in a training phase during which the integrated circuit is operated in a normal temperature range.

3. The method of claim 1 wherein the generating the indication of detection of the cold-boot attack comprises comparing the number of bits in the first state to one or more threshold values.

4. The method of claim 3 wherein the first state is a one state.

5. The method of claim 1, comprising periodically repeating the sampling, the generating of the indication of the proportion and the generating of the indication of detection of a cold-boot attack.

6. A device, comprising:
a logic circuit having a plurality of ring oscillators, wherein the logic circuit, in operation, XORs outputs of the plurality of ring oscillators together, generating an output signal; and
sampling circuitry, which, in operation:
samples the output signal generated by the logic circuit;
generates an indication of a proportion of bits in the sampled output signal in a first state;
generates an indication of detection of a cold-boot attack based on the generated indication of the proportion of the bits in the first state; and
generates one or more signals to restrict access to the device in response to the indication of detection of a cold-boot attack indicating a cold-boot attack, wherein:
the sampling circuitry is configured to count a number of bits in the sampled output signal in the first state and to generate the indication of detection of the cold-boot attack based on whether the counted number of bits is within a range of values; and
the range of values is determined by statistical analysis in a training phase during which the integrated circuit is repeatedly switched down and up.

7. The device of claim 6 wherein the device is an integrated circuit.

8. The device of claim 6 wherein said range of values is determined by statistical analysis in a training phase during which the integrated circuit is operated in a normal temperature range.

9. The device of claim 6 wherein the sampling circuitry is configured to compare the counted number of bits in the first state to one or more threshold values.

10. The device of claim 6 wherein the sampling circuitry is configured to periodically repeat the sampling, the generating of the indication of the proportion and the generating of the indication of detection of a cold-boot attack.

11. The device of claim 6 comprising a flip-flop configured to sample the output signal of the logic circuit.

12. The device of claim 6, comprising a non-volatile memory having said range of values stored therein.

13. The device of claim 7, comprising a volatile memory configured to store information.

14. A system, comprising:
a processor;
a random access memory; and
cold-boot attack detection circuitry, including:
a logic circuit having a plurality of ring oscillators, wherein the logic circuit, in operation, XORs outputs of the plurality of ring oscillators together, generating an output signal of the logic circuit; and
sampling circuitry configured to:
sample the output signal generated by the logic circuit;
generate an indication of a proportion of bits in the sampled output signal in a first state;
generate an indication of a cold-boot attack based on the generated indication of the proportion of the bits in the first state; and
generate one or more signals to restrict access to at least one of the processor and the memory in response to the indication of detection of a cold-boot attack indicating a cold-boot attack, wherein:
the generating the indication of the proportion comprises counting a number of bits in the first state and the generating the indication of detection of the cold-boot attack comprises determining whether the number of bits in the first state is within a range of values; and
the range of values is determined by statistical analysis in a training phase during which the integrated circuit is repeatedly switched down and up.

15. The system of claim 14 comprising an integrated circuit including the cold-boot attack detection circuitry.

16. The system of claim 14 wherein the sampling circuitry is configured to periodically repeat the sampling, the generating of the indication of the proportion and the generating of the indication of detection of a cold-boot attack.

17. A method, comprising:
sampling, using a sampling circuit, an output signal of a logic circuit of an integrated circuit, the logic circuit including a plurality of ring oscillators having outputs XORed together;
generating, using the sampling circuit, an indication of a shape of the output signal of the logic circuit;
generating, using the sampling circuit, an indication of detection of a cold-boot attack based on the generated indication of the shape of the output signal; and
restricting access to the integrated circuit in response to the indication of detection of a cold-boot attack indicating a cold-boot attack, wherein the method comprises training the sampling circuit in a training phase during which the integrated circuit is repeatedly switched down and up.

18. The method of claim 17, comprising training the sampling circuit in a training phase during which the integrated circuit is operated normally.

* * * * *